United States Patent [19]

Böning

[11] Patent Number: 4,635,191
[45] Date of Patent: Jan. 6, 1987

[54] METHOD FOR CONTROLLING DATA TRANSFER BETWEEN A DATA TRANSMITTER AND A DATA RECEIVER THROUGH A BUS BY MEANS OF A CONTROL DEVICE CONNECTED TO THE BUS, AND A CONTROL DEVICE FOR CARRYING OUT THE METHOD

[75] Inventor: Werner Böning, Munich, Fed. Rep. of Germany

[73] Assignee: Siemens Aktiengesellschaft, Berlin and Munich, Fed. Rep. of Germany

[21] Appl. No.: 546,895

[22] Filed: Oct. 31, 1983

[30] Foreign Application Priority Data

Nov. 9, 1982 [DE] Fed. Rep. of Germany ....... 3241402

[51] Int. Cl.[4] .......................... G06F 13/00; G06F 9/00
[52] U.S. Cl. .................................................... 364/200
[58] Field of Search ... 364/200 MS File, 900 MS File

[56] References Cited

U.S. PATENT DOCUMENTS

| | | | |
|---|---|---|---|
| 4,115,854 | 9/1978 | Capowski et al. | 364/200 |
| 4,245,305 | 1/1981 | Gechele et al. | 364/200 |
| 4,403,282 | 9/1983 | Holberger | 364/200 |
| 4,419,728 | 12/1983 | Larson | 364/200 |
| 4,485,438 | 11/1984 | Myrmo et al. | 364/200 |
| 4,516,199 | 5/1985 | Frieder et al. | 364/200 |

Primary Examiner—Raulfe B. Zache
Assistant Examiner—William G. Niessen
Attorney, Agent, or Firm—Herbert L. Lerner; Laurence A. Greenberg

[57] ABSTRACT

The data transmitter is formed as a memory connected to the bus for storing a channel program containing transfer commands. The control device includes a comparison device and first and second registers connected to the comparison device having mutually correlated register positions marking termination causes. The control device controls the data transfer between the data transmitter and data receiver as a function of the channel program stored in the memory. The device processes a transfer command in the control device, sets a register position marking a termination cause in the first register after terminating the processing of the transfer command, sets the register positions of the second register correlated with the register positions of the first register with a control command for execution of a conditional control after the transfer command, compares mutually correlated register positions of the first and second registers with each other to produce a comparison result, and executing the conditional control command or a command of the channel program following the conditional control command as a function of the comparison result. A device for carrying out the method is included.

9 Claims, 5 Drawing Figures

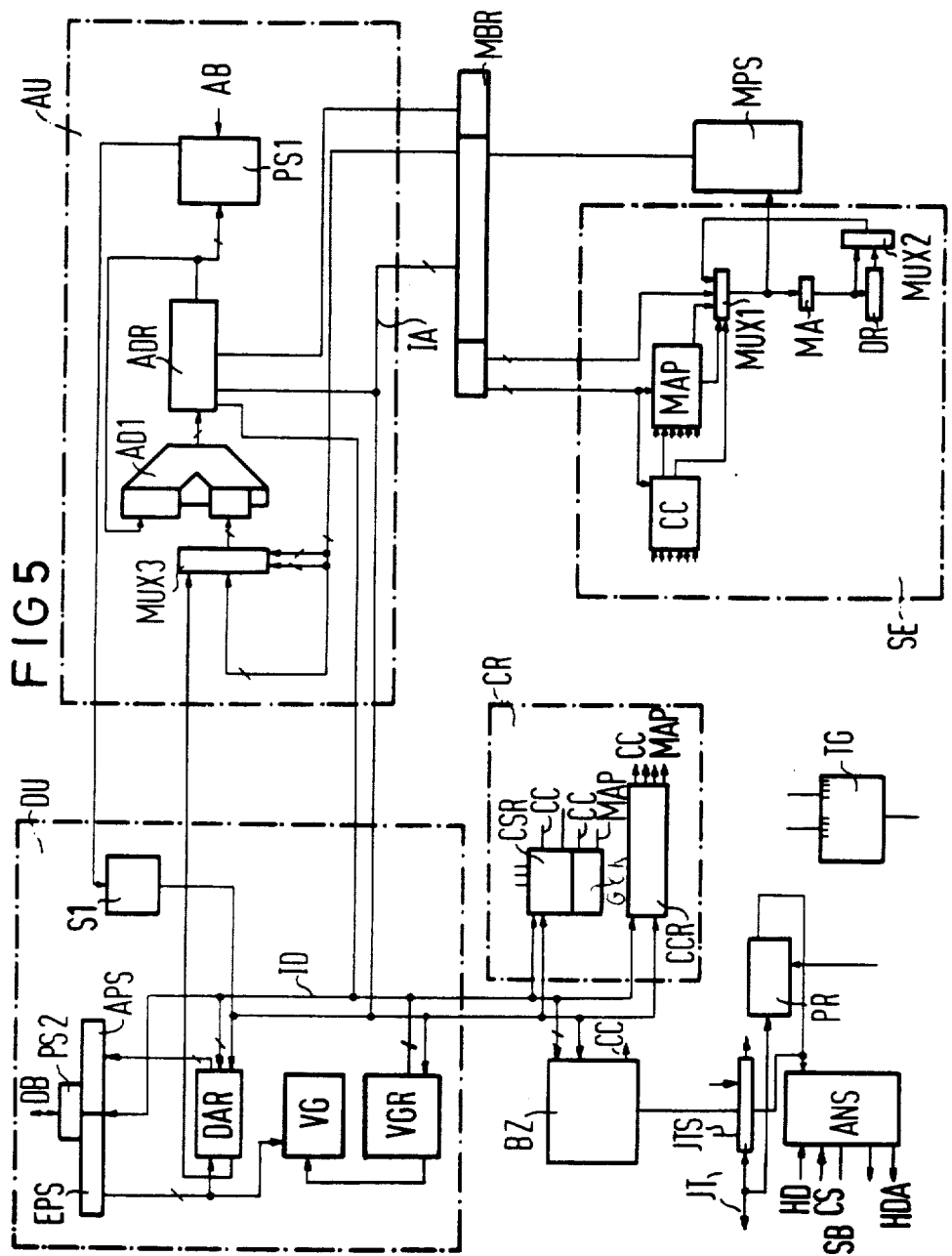

METHOD FOR CONTROLLING DATA TRANSFER BETWEEN A DATA TRANSMITTER AND A DATA RECEIVER THROUGH A BUS BY MEANS OF A CONTROL DEVICE CONNECTED TO THE BUS, AND A CONTROL DEVICE FOR CARRYING OUT THE METHOD

BACKGROUND OF THE INVENTION

1. Field of the Invention

The invention relates to a method for controlling data transfer between a data transmitter and a data receiver through a bus by means of a control device connected to the bus, which controls the data transfer as a function of a channel program containing transfer commands and control commands stored in a memory. The invention also relates to a control device for carrying out the method.

2. Description of the Prior Art

In microcomputer systems it is often necessary to transmit data between a data transmitter, e.g. a memory, and a data receiver, e.g. peripheral equipment. This data transfer between the memory and the peripheral equipment is controlled by a microprocessor To this end, the microprocessor, the memory and the peripheral equipment are connected to a bus in which an address bus, a data bus, and a control bus are combined. The control of the data transfer between the data transmitter and the data receiver occurs as a function of a channel program containing transfer commands and control commands.

A so-called DMA peripheral control has been connected to the bus in order to relieve the microprocessor of the data transfer. The DMA peripheral control controls the data transfer between the data transmitter and data receiver automatically to a great extent. Microcomputer systems with a DMA control are described e.g. in the publication "Elektronik Praxis" No. 9, September 1982, pp, 131 to 134.

As described above, the data transfer is controlled by means of channel commands. A channel command contains the channel command word, which describes the operation to be carried out, and various parameters, as for example the number of bytes to be transmitted, the address of the data transmitter, and the address of the data receiver. Several such channel commands can be joined by so-called concatenation or command linking to form a channel program. Besides the channel commands, which control the actual data transfer, there are also control commands by which organizational tasks are fulfilled. Such an organizational task is at hand after a data transfer has been run, and the next channel command is to be processed only if a pre-established condition is fulfilled. If this condition is not fulfilled, either another channel command must be executed as the next channel command, or the handling of the channel program must be terminated. However, it has not been possible heretofore for such conditional control commands to be carried out automatically by the control device, to relieve the microprocessor.

SUMMARY OF THE INVENTION

It is accordingly an object of the invention to provide a method for controlling the data transfer between a data transmitter and a data receiver through a bus by means of a control device connected to the bus, and a control device for carrying out the method, which overcomes the hereinafore-mentioned disadvantages of the heretofore-known methods and devices of this general type, wherein the control device can automtically execute such conditional control commands.

With the foregoing and other objects in view there is provided, in accordance with the invention, a method for controlling data transfer between a data transmitter and a data receiver through a bus by means of a control device connected to the bus, the data transmitter being in the form of a memory connected to the bus for storing a channel program containing transfer commands and control commands, and the control device including a comparison device and first and second registers connected to the comparison device having mutually correslated register positions marking termination causes, the control device controlling the data transfer between the data transmitter and data receiver as a function of the channel program stored in the memory, which comprises processing a transfer command in the control device, setting a register position marking a termination cause in the first register after terminating the processing of the transfer command, setting the register positions of the second register correlated with the register positions of the first register with a control command for execution of a conditional control after the transfer command, comparing mutually correlated register positions of the first and second registers with each other to produce a comparison result, and executing the conditional control command or a command of the channel program following the conditional control command as a function of the comparison result.

In such a method, the termination cause of a transfer command, which (cause) is retained in the control device anyway, is utilized for executing conditional control commands. The detection as to whether or not a conditional control command is being executed is performed by the control device.

The function of the control device can be expanded further if, in accordance with another mode of the invention there is provided a method which comprises selectively supplying the contents of the register positions of the first register marking the termination causes to the comparison device in inverted or non-inverted form.

If a condition is fulfilled, this may lead to a branching in the channel program, with the address of the next channel command to be executed being derivable from a part of the conditional control command, or the handling of the channel program can be terminated (conditional stop command). Therefore, in accordance with a further mode of the invention, there is provided a method which comprises deriving the address of the next channel command from the conditional control command in the case of a conditional branching,, or in accordance with an added mode of the invention there is provided a method which comprises terminating the processing of the channel program if the comparison result is positive.

In order to enable the microprocessor to be informed about the execution of a conditional control command, in accordance with an additional mode of the invention there is provided a method which comprises delivering an interrupt request from the control device if the comparison result matches.

The expense required for the control device is especially small if in accordance with again another mode of the invention the first register is a channel status register disposed in the control device, in which case the method comprises setting the register position of the first register marking the termination cause, after termination of the processing of a transfer command and in accordance with again a further mode of the invention the second register is a channel command register disposed in the control device, in which case the method comprises storing the channel command to be processed by the control device in the second register.

In order to carry out the method, there is provided a DMA control device for controlling data transfer between a data transmitter and a data receiver through a bus, the data transmitter being in the form of a memory connected to the bus for storing a channel program containing transfer commands and control commands, the control device comprising a sequencer control connected to the bus, a microprogram memory connected to the sequencer control for storing microprograms correlated with the channel commands, a first channel status register connected to the sequencer control having register positions for marking termination causes, and a second channel command register connected to the sequencer control having register positions correlated with the register positions of the first register for storing the channel commands, the sequencer control including a condition multiplexer having a comparison device for comparing the mutually correlated register positions of the first and second registers with each other.

In accordance with a concomitant feature of the invention, the control device includes an address unit connected to the sequencer control hacing an address register for addressing the channel command to be processed in the memory, and an address computer connected to the address register for calculating the address of the next channel command in the memory by means of the control command, in the case of a channel program branching.

The method of the invention permits the control device to automatically carry out the following representative steps, without using the microprocessor; a channel command can be repeated automatically; a program-controlled interrupt can be delivered to the microprocessor, even during an input/output operation. The interrupt message serves to alert the microprocessor about the progress of a data transfer, such as if the microprocessor tends to operate with the data which was read first; a command can be initiated with issuance of an equipment number of the peripheral equipment, the state of the equipment being checked, and the command being executed only if the check is positive; the data block to be transferred can be searched bytes or words and the data transfer can be terminated in the case of a non-match, for example.

Other features which are considered as characteristic for the invention are set forth in the appended claims.

Although the invention is illustrated and described herein as embodied in a method for controlling data transfer between a data transmitter and a data receiver through a bus by means of a control device connected to the bus, and a control device for carrying out the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

BRIEF DESCRIPTION OF THE DRAWING

FIG. 5 is a schematic circuit diagram of a DMA control device.

DESCRIPTION OF THE PREFERRED EMBODIMENTS

Figure 1:
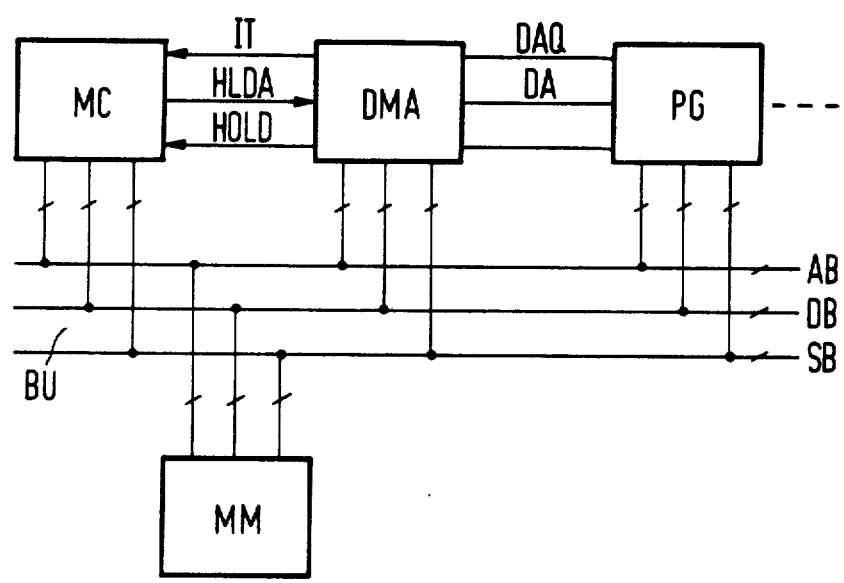
FIG. 1 is a block circuit diagram of a microcomputer system.

Referring now to the figures of the drawing in detail and first particularly to FIG. 1 thereof, there is seen a block diagram of a microcomputer system. A bus BU shown in FIG. 1 includes an address bus AB, a data bus DB and a control bus SB. A microprocessor MC, a memory MM, peripheral equipment PG and a DMA control DMA are connected to the bus BU. Naturally, several items of peripheral equipment PG, such as data viewers, may be connected to such a bus system BU. A conventional microprocessor MC, such as model IAPX 80286 manufactured by the firm Intel, handles programs in which data transfer between a data transmitter, e.g. the memory MM, and a data receiver, e.g. the peripheral equipment PG, is also necessary. When such a data transfer is to be carried out, the microprocessor MC delivers a channel start command to the DMA control. The channel program required for the execution of the start command may be obtained, for instance, in the memory MM and can be provided with the desired parameters by the microprocessor MC. In addition, the microprocessor MC communicates the address which the first channel command has in the memory MM, to the control device DMA. Thereafter the control device DMA automatically takes over the running of the channel program; the microprocessor MC can then turn to other tasks. To avoid collision between the bus cycles of the control unit DMA and of the microprocessor MC, the DMA control must have previously reported its busying or usage of the bus in the microprocessor MC through the use of a signal HOLD and must have had the microprocessor MC assign the bus to it through the use of a signal HLDA.

The control device DMA extracts the first channel command from the memory MM and establishes that a data transfer between the memory MM and the peripheral equipment PG is to be carried out. After the equipment has been started, and when the peripheral equipment PG is ready for data transfer, the peripheral equipment sends a service request (DA) to the control device DMA and the control device DMA acknowledges the request with a signal DAQ and starts the transmission of data from the memory MM to the peripheral equipment PG.

The transfer commands in the channel program can be terminated in various ways. Normally a transfer command has been completed when all data have been transmitted. For this reason, the data to be transmitted is stated in the transfer command. Other causes for termination may exist if the byte or word to be transmitted does not coincide with a given word or byte or if, for example, the microprocessor MC desires an interruption of the data transfer. These causes characterizing the termination of the data transfer can be used for executing control commands determined by the control device DMA. To this end, the channel program has a conditional control command disposed therein behind the transfer command. After the conditional control command, a branching to a later channel command may be carried out. This conditional control command includes an indication of the data transfer termination cause for which the conditional control command is or is not to be executed by the control device DMA. In fact, the control device DMA compares the termination causes indicated in the conditional control command with the termination causes existing after termination of the data transfer, and if the comparison result turns out positive, it executes the conditional control command and executes the channel command disposed in the channel program after the conditional control command.

Figure 2:
FIG. 2 is an illustration of the set-up of a control command.
Figure 3:
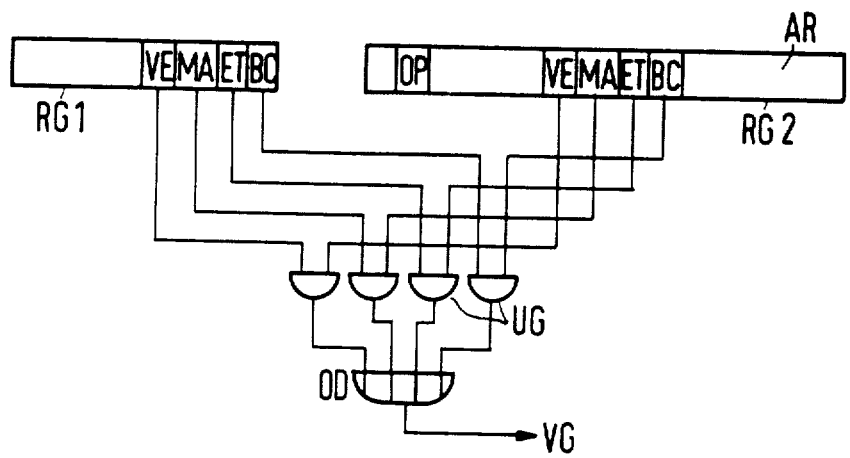
FIG. 3 is a schematic circuit diagram of a first comparison device.

FIG. 3 illustrates a comparison device with which this can be carried out. FIG. 3 shows a first register RG 1 having register positions in which the termination causes terminating the data transfer, are indicated. These termination causes are indicated in FIG. 3 in register positions BC, ET, MA and VE. The control command is stored in a register RG 2. The register RG 2 also has register positions VE, MA, ET and BC, which are set when the conditional control command stored in register RG 2 is or is not to be executed in the presence of the indicated termination cause. In addition to the termination causes, the conditional control command which is stored in register RG 2 contains an operation code OP which indicates whether, in the case at hand, a branching to another channel command of the channel program is to be carried out or the handling of the channel program is to be terminated. The type of command can be established by a code in a component TY shown in FIG. 2, e.g. whether it is a control command or a transfer command. A part AR of the control command is also provided, with which a portion of the entire address of the channel command can be stated, under which the next channel command to be worked up is present in the memory MM after a branching takes place.

In order to establish whether or not the conditional control command is to be executed, the mutually correlated register positions VE, MA, ET and BC of the register RG 1 and of the register RG 2 are compared with one another with the aid of AND elements UG as seen in FIG. 3, and if the comparison result is positive, that is, if one of the termination causes in the register RG 1 is also set in the register RG 2, a signal VG is delivered. To this end, the AND elements UG are combined by means of an OR element OD.

Figure 4:
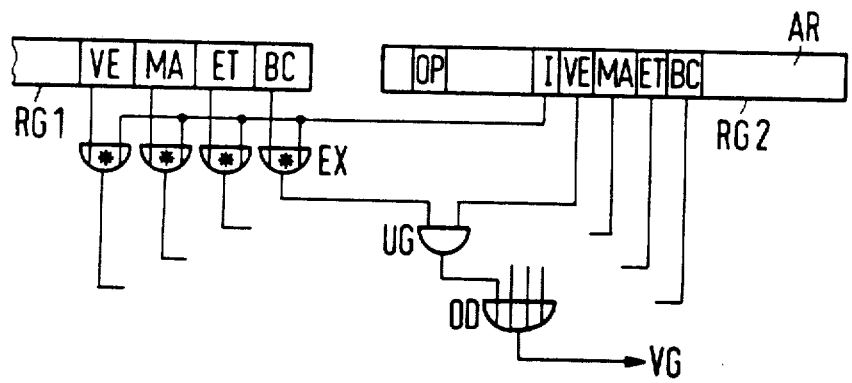
FIG. 4 is a view similar to FIG. 3 of a second comparison device.

The operating range of the comparison device can be expanded if it is possible to supply termination causes UR from the register RG 1 to the comparison device in inverted or non-inverted form. A comparison device which fulfills this task is shown in FIG. 4. In the FIG. 4 device, AND elements UG are preceded by Exclusive OR elements EX, which are coupled with the register positions for the termination causes in the register RG 1, and are also coupled with a register position I in register RG 2. If the register position I is at logic 0, the termination causes in the register RG 1 are evaluated in a non-inverted form, whereas if the position I is at logic 1, the termination causes in the register RG 1 are evaluated by the comparison device in an inverted form.

Finally, if a positive comparison result VG is at hand, it may be meaningful to give an interrupt request IT to the microprocessor MC. If this is desired, an additional bit IT may be set in a control command ST shown in FIG. 2. This indicates to the control device DMA whether or not an interrupt request IT is to be given to the microprocessor MC, in the presence of a positive comparison result VG.

The set-up of the control command ST, specifically the set-up of the parts required for the execution of a conditional control command, is evident once more from FIG. 2. The significance of the individual parts of this control command ST has been explained above.

If the control device DMA is constructed in the form of a sequencecontrolled DMA control, the expense required for executing the conditional control commands is especially small. Such a sequencecontrolled DMA control is illustrated in FIG. 5.

The sequencer control SE is formed in a conventional manner of a condition multiplexer CC, a command decoder MAP, a first multiplexer MUX1, a microcommand address register MA, an address adder DR, and a second multiplexer MUX2. Such a sequencer control SE is known, for example, from the above-mentioned "Elektronik Praxis" publication. The sequencer control SE is coupled with a microprogram memory MPS, in which microprograms correlated with the channel commands are stored. The sequencer control SE therefore addresses the microprogram associated with the channel command, as a function of the channel command word which is supplied to the command decoder MAP. The microcommands delivered by the microprogram memory MPS are temporarily stored in a microcommand register MBR, and the control information defined in the microcommand is fed from the microcommand register to the individual units of the DMA control, either through an internal address bus and control bus IA, or directly.

The DMA control furthermore contains an address unit AU in which the address of the channel command which is stored in memory MM and is to be executed is contained in an address register ADR. The channel command addresses can be modified in the address unit AU, by means of an adder or address computer AD1. An address from the address register ADR and a quantity can be supplied by a multiplexer MUX3 to the adder AD1. The multiplexer MUX3 is actuated by the microcommand of the microcommand register MBR; the quantity to be added to the address may also originate from the microcommand register MBR or it may be separately supplied to the multiplexer MUX3. The address for the address bus AB is supplied by the address register ADR through a buffer memory PS1.

The DMA control also contains a data unit DU which in particular contains a data register DAR. The data unit DU is connected to the data bus DB. The data to be transferred to or from the data bus DB are temporarily stored in a buffer memory PS2 and then either pass to an input buffer memory EPS or to an output buffer memory APS. The data register DAR is connected with both the input buffer memory EPS and the output buffer memory APS. Furthermore the data register DAR is connected to an internal data bus ID and to the internal address and control bus IA. The data unit DU additionally includes a comparison device VG and a comparison register VGR. The address from the external address bus AB can be supplied by the address unit AU to the internal address and control bus IA by a switch S1.

The DMA control also contains a control register circuit CR. This control register circuit CR in particular contains a channel status register CSR, a channel command register CCR, and a command register GCR. The command register GCR may contain the start command which indicates that the running of a channel program is to be started or ended and, when there are several channels, through which channel the data transfer is to take place. On the other hand, the channel command register CCR contains the channel command to be worked up by the DMA control The channel status register CSR may indicate why a data transfer was terminated.

Further elements found in the DMA control according to FIG. 5 are a byte counter BZ, which counts the number of bytes transmitted, a priority circuit PR, a circuit JTS for delivering an interrupt request JT, a clock generator TG, and a matching circuit ANS, through which the DMA control is adapted to the microprocessor MC. The microprocessor MC used in this instance is the above-mentioned microprocessor IAPX 80286 of the firm Intel.

In such a DMA control, the channel status register CSR of the control register circuit CR can be used as the register RG 1, and the channel command register CCR can be used as the register RG 2. The comparison device of FIG. 3 and of FIG. 4 may be contained in the condition multiplexer CC of the sequencer control SE, which is connected on one hand with the channel status register CSR, and on the other hand, with the channel command register CCR, as indicated by the arrows and lines CC in the control register circuit CR. The channel command contained in the channel command register CCR is furthermore connected to the command decoder MAP, as seen by the arrows MAP. The command decoder MAP is also actuated by the condition multiplexer CC. The command decoder MAP applies a different address to the first multiplexer MUX1, depending on the channel command in the channel command register CCR and the content of the channel status register CSR.

The operation of the DMA control according to FIG. 5 will be briefly described below, only those units which are necessary for the description of the invention being explained more specifically. It is assumed that the required channel programs are stored in the memory MM.

To begin with, the microprocessor MC loads the command register GCR with the start command and stores the address of the first channel command of the memory MM, in the address register ADR. To this end, the microprocessor MC sends a signal CS to the control the applies the corresponding data at the data bus DB. The data (command, address) are fed through the internal data bus ID either to the address register ADR or to the command register GCR. The microprocessor MC will then address the respective registers and storage cells in the memory MM. The command register GCR is connected to the command decoder MAP of the sequencer SE. The DMA control therefore takes over the further execution of the channel program. The command decoder MAP produces the address of the microprogram which is necessary for the command initiation, the in the microprogram memory MPS. This microprogram causes the first channel command to be extracted from the memory MM. The first channel command has an address that is stored in the address register ADR, and it is issued through the address bus AB. This channel command is fed by way of the data bus DB, the buffer PS2 and the buffer EPS to the data register DAR and moreover through the internal data bus ID to the channel command register CCR. Furthermore, a register in the byte counter BZ is loaded with the number of data to be transmitted. Finally, the DMA control loads the address of the data transmitter and the address of the data receiver into the address register ADR. The channel command and the associated parameters are thus contained in the DMA control.

The DMA control begins with the handling of the first channel command in the channel command register CCR. The channel command register CCR is connected to the command decoder MAP which develops the address of the microprogram in the microcommand register MPS associated with the channel command, from the channel command. This register is actuated, and if the first channel command is a transfer command, the data transmission is carried out. To this end, the individual bytes to be transmitted may be transferred over the data bus DB into the data register DAR and then again transferred over the data bus DB to the peripheral equipment PG. At the same time, the byte counter BZ reduces its content by one unit. This process repeats until the byte counter BZ has reached the value 0. In fact, the data transmission is thereby terminated, and this is reported to the condition multiplexer CC and to the command decoder MAP. The sequencer SE now provides for the storing of the termination cause in the channel status register CSR and for the extraction of the next channel command from the memory MM. The address of the next channel command in the address register ADR has previously been recalculated by means of the address adder AD1. To this end, a certain quantity, which had been supplied to the adder through the multiplexer MUX3, had been added to the old address. The new address is issued over the address bus AB, and the second channel command word from memory MM is stored into the channel command register CCR through the data bus DB.

It can be assumed that the second channel command word is a conditional control command. This conditional control command is setup according to FIG. 2. Since both the channel status register CSR and the channel command register CCR are connected to the condition multiplexer CC, the condition multiplexer CC can check whether or not one of the termination causes contained in the control command exists in the channel status register CSR. If that is the case, the condition is fulfilled, and the condition multiplexer CC causes the command decoder MAP to actuate the correct microprogram in the microprogram memory MPS as a function of the operation code OP of the control command. If the operation code OP indicates that a branching to another channel command is to be carried out, the address of the new channel command in the address unit AU is calculated. The new address may result from a part of the control command ST which is supplied to the address adder AD1 by the multiplexer MUX3. This value can be taken into the address register ADR in a form which is unchanged or is modified by the address adder AD1. The address of the new channel command is again issued through the address bus AB, and the associated channel command is transferred from the memory MM into the command register CCR.

If on the contrary, the command decoder MAP establishes from the operation code of the control command that, if the condition prevails, the handling of the channel program is to be terminated, then the sequencer SE actuates the respective microprogram in the microprogram memory MPS and causes the termination of the handling of the channel program.

If the condition prevails, the circuit JTS can be caused to furnish an interrupt request JT, as a function of the control command ST, namely of the bit JT.

The termination cause may also take the form of a comparison of the content of the data register DAR in the comparison device VG with the content of the comparison register VGR. In case of a nonmatch, a signal can be sent to the channel status register and the register position correlated therewith can be set. The condition multiplexer CC in turn can compare the content of the channel command register CCR and the content of the channel status register CSR and, if the result is positive, can cause the command decoder MAP to actuate the correct microprogram in the microprogram memory MPS.

Since the detailed description of the priority circuit PR and the matching circuit ANS are not necessary for the understanding of the method of the invention, they have not been discussed in detail. It is only necessary for the description of the method according to the invention to specifically describe the interaction of the channel status register CSR, the channel command register CCR and the sequencer SE in the DMA control.

The foregoing is a description corresponding in substance to German application No. P 32 41 402.1, dated Nov. 9, 1982, the International priority of which is being claimed for the instant application, and which is hereby made part of this application. Any material discrepancies between the foregoing specification and the aforementioned corresponding German application are to be resolved in favor of the latter.

What is claimed is:

1. Method for controlling data transfer between a data transmitter and a data receiver through a bus by means of a control device connected to the bus, and by means of a memory connected to the bus for storing a channel program containing transfer commands including conditional control commands the control device including a comparison device and first and second registers connected to the comparison device including mutually correlated register positions, the contents of the register positions being used for indicating one of several possible termination causes by setting the contents of the register positions to a logical 0 or 1, comprising the steps of: controlling by means of the control device, the data transfer between the data transmitter and data receiver as a function of the channel program stored in the memory, processing a transfer command in the control device, setting a register position content to indicate a termination cause in the first register after terminating the processing of the transfer command, setting the register positions of the second register correlated with the register positions of the first register with a control command for execution of a conditional control after the transfer command, comparing mutually correlated register positions of the first and second registers with each other to produce a comparison result, and executing the conditional control command or a command of the channel program following the conditional control command as a function of the comparison result.

2. Method according to claim 1, which comprises selectively supplying the contents of the register positions of the first register marking the termination causes to the comparison device in inverted or non-inverted form.

3. Method according to claim 1, which comprises deriving the address of the next channel command from the conditional control command in the case of a condition branching.

4. Method according to claim 1, which comprises terminating the processing of the channel program if the comparison result is positive.

5. Method according to claim 1, which comprises delivering an interrupt request from the control device if the comparison result matches.

6. Method according to claim 1, wherein the first register is a channel status register disposed in the control device, which comprises setting the register position of the first register marking the termination cause, after termination of the processing of a transfer command.

7. Method according to claim 1, wherein the second register is a channel command register disposed in the control device, which comprises storing the channel command to be processed by the control device in the second register.

8. DMA control device for controlling data transfer between a data transmitter and a data receiver through a bus, and by means of a memory connected to the bus for storing a channel program containing transfer commands and control commands, the control device comprising : a sequencer control connected to the bus, a microprogram memory connected to said sequencer control for storing microprograms correlated with the channel commands, a first channel status register connected to said sequencer control having register positions being set to a logical 0 or 1 to indicate termination causes, and a second channel command register connected to said sequencer control having register positions correlated with said register positions of said first register for storing the channel commands, said sequencer control including a condition multiplexer having a comparison device for comparing said mutual correlated register positions of said first and second registers with each other.

9. Control device according to claim 8, wherein the control device includes an address unit connected to said sequencer control having an address register, a channel command being addressable by the address register to be processed in the memory, a control command included in the channel program, and an address computer connected to said address register for calculating the address of the next channel command in the memory by means of the control command, in the case of a channel program branching.

* * * * *